(12) United States Patent
Morey et al.

(10) Patent No.: US 8,991,534 B2
(45) Date of Patent: Mar. 31, 2015

(54) AIR FILTER ARRANGEMENT FOR A WORK VEHICLE

(71) Applicant: CNH America LLC, New Holland, PA (US)

(72) Inventors: Daniel A. Morey, Mundelein, IL (US); William H. Adamson, Naperville, IL (US); Ronald D. Smith, Parker, CO (US); Nicholas J. Prenger, Western Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/077,332

(22) Filed: Nov. 12, 2013

(65) Prior Publication Data

US 2014/0182956 A1    Jul. 3, 2014

Related U.S. Application Data

(60) Provisional application No. 61/726,809, filed on Nov. 15, 2012.

(51) Int. Cl.
| | |
|---|---|
| *B60K 11/00* | (2006.01) |
| *F01P 11/12* | (2006.01) |
| *F02M 35/16* | (2006.01) |
| *F02M 35/06* | (2006.01) |
| *B60K 11/06* | (2006.01) |
| *F01P 3/18* | (2006.01) |
| *F02M 35/04* | (2006.01) |
| *F02M 35/10* | (2006.01) |

(52) U.S. Cl.
CPC .............. *F01P 11/12* (2013.01); *F02M 35/161* (2013.01); *F02M 35/164* (2013.01); *F02M 35/06* (2013.01); *B60K 11/06* (2013.01); *F01P 3/18* (2013.01); *F02M 35/048* (2013.01); *F02M 35/10013* (2013.01)
USPC ........................................................ 180/68.1

(58) Field of Classification Search
USPC ................ 280/68.1–68.5; 123/41.65; 55/383, 55/385.3
See application file for complete search history.

(56) References Cited

U.S. PATENT DOCUMENTS

| | | |
|---|---|---|
| 6,857,399 B2 | 2/2005 | Davis et al. |
| 7,278,504 B2 | 10/2007 | Smith et al. |
| 7,682,413 B2 | 3/2010 | Sheidler |
| 7,875,093 B1 | 1/2011 | Hershbarger et al. |
| 7,998,233 B2 | 8/2011 | Maeda et al. |
| 2010/0071978 A1* | 3/2010 | Kisse ............................ 180/68.2 |
| 2010/0275862 A1 | 11/2010 | Cassell, Jr. et al. |

* cited by examiner

*Primary Examiner* — John Walters
*Assistant Examiner* — James Triggs
(74) *Attorney, Agent, or Firm* — Sue C. Watson

(57) ABSTRACT

An air filter arrangement for a work vehicle is disclosed. The air filter arrangement may include a fan shroud extending between a shroud inlet and a shroud outlet and at least one heat exchanger disposed adjacent to the shroud inlet. The air filter arrangement may also include a fan disposed within the fan shroud between the shroud inlet and shroud outlet. The fan may be configured to draw air through the heat exchanger and between the shroud inlet and shroud outlet. Additionally, the air filter arrangement may include an air filter disposed within the fan shroud between the fan and the heat exchanger such that the air flowing through at least one heat exchanger and between the shroud inlet and shroud outlet is directed around the air filter.

15 Claims, 4 Drawing Sheets

AIR FILTER ARRANGEMENT FOR A WORK VEHICLE

FIELD OF THE INVENTION

The present subject matter relates generally to work vehicles and, more particularly, to an air filter arrangement for a work vehicle.

BACKGROUND OF THE INVENTION

Typically, work vehicles include a large number of under-hood components, such as the various components included within the air intake, air cleaning, fuel supply, electrical, cooling and exhaust systems of a work vehicle. As such, these components must be carefully designed to fit within the limited space of the vehicle's engine compartment.

In general the air filter of the vehicle's air cleaning system is one of the last components designed into the engine compartment. Thus, air filters are typically engine-mounted or body-mounted where space permits. Unfortunately, such positioning of the air filter often requires a complex piping scheme, with large amounts of plumbing, to route dirty intake air to the air filter and cleaned air from the filter to the engine.

Accordingly, it is desired to have an air filter arrangement for a work vehicle that reduces the total amount of plumbing required to route air from the intake location to the engine and/or that provides additional open space within the engine compartment for other under-hood components of the work vehicle.

BRIEF DESCRIPTION OF THE INVENTION

Aspects and advantages of the invention will be set forth in part in the following description, or may be obvious from the description, or may be learned through practice of the invention.

In one aspect, the present subject matter discloses an air filter arrangement for a work vehicle. The air filter arrangement may include a fan shroud extending between a shroud inlet and a shroud outlet and at least one heat exchanger disposed adjacent to the shroud inlet. The air filter arrangement may also include a fan disposed within the fan shroud between the shroud inlet and shroud outlet. The fan may be configured to draw air through the heat exchanger and between the shroud inlet and shroud outlet. Additionally, the air filter arrangement may include an air filter disposed within the fan shroud between the fan and the heat exchanger such that the air flowing through at least one heat exchanger and between the shroud inlet and shroud outlet is directed around the air filter.

In another aspect, the present subject matter discloses an air filter arrangement for a work vehicle. The air filter arrangement may include a fan shroud defining a shroud inlet and a shroud outlet and a fan disposed within the fan shroud between the shroud inlet and shroud outlet. The fan may be configured to draw air into the shroud inlet. The air filter arrangement may also include an air filter disposed within the fan shroud. The air filter may be configured to receive and filter dirty air entering a portion of the work vehicle, wherein the dirty air received by the air filter is isolated from the air being drawn into the shroud inlet.

In a further aspect, the present subject matter is directed to a work vehicle including an engine and a hood enclosure surrounding at least a portion of the engine. The hood enclosure may include a front grille. The work vehicle may also include a fan shroud disposed between the front grille and the engine. The fan shroud may include a shroud inlet and a shroud outlet. Additionally, the work vehicle may include at least one heat exchanger disposed adjacent to the shroud inlet and a fan disposed within the fan shroud between the shroud inlet and shroud outlet. The fan may be configured to draw air through the heat exchanger and between the shroud inlet and shroud outlet. Moreover, the work vehicle may include an air filter disposed within the fan shroud between the fan and the heat exchanger such that the air flowing through the heat exchanger and between the shroud inlet and shroud outlet is directed around the air filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
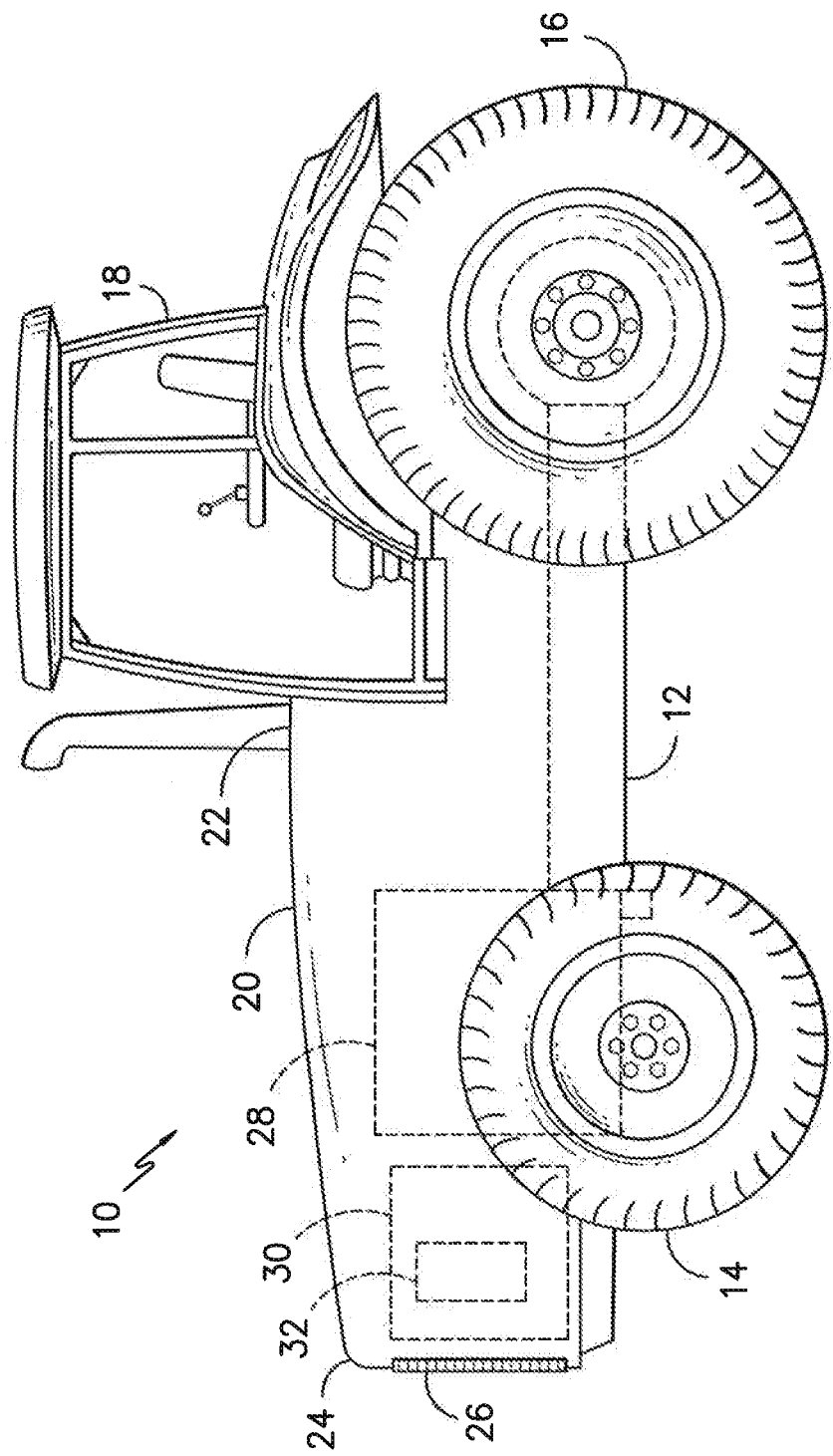
FIG. 1 illustrates a side view of one embodiment of a work vehicle.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an air filter arrangement for a work vehicle. Specifically, in several embodiments, the air filter may be positioned within a fan shroud of the cooling system of the work vehicle, such as by positioning the air filter between a shroud inlet of the fan shroud and cooling fan of the work vehicle. Additionally, in such an embodiment, the inlet and outlet ducts for the air filter may extend from the air filter to a location outside the fan shroud. For example, the inlet duct may extend from the air filter and through the fan shroud to a position adjacent to the shroud inlet. As such, the air entering the work vehicle may be directed through a front grille of the vehicle and into either the inlet duct of the air filter or the shroud inlet.

By positioning the air filter within the fan shroud of the vehicle's cooling system, it has been found that the amount of plumbing necessary to rout air from the intake location at the front of the vehicle to the engine may be significantly reduced, thereby lowering the overall cost of the vehicle's air cleaning system. Moreover, such an air filter arrangement may also open up space under the hood for other components of the work vehicle.

Referring now to the drawings, FIG. 1 illustrates a side view of one embodiment of a work vehicle 10 in accordance with aspects of the present subject matter. It should be appreciated that, although the work vehicle 10 illustrated herein is configured as an agricultural tractor, the work vehicle 10 may generally be configured as any suitable work vehicle known in the art, such as various other agricultural vehicles (e.g., combines), earth-moving vehicles, road vehicles, loaders and/or the like.

As shown, the work vehicle 10 generally include a chassis or frame 12 that is supported by a pair rear wheels 16 and a pair of front wheels 14, with the rear wheels 16 and/or front wheels 14 being configured as drive wheels. An operator's compartment or cab 18 may be supported along a rear portion of the frame 12 and a hood enclosure 20 may be supported along a front portion of the frame 12. The hood enclosure 20 may generally extend between an aft end 22 disposed adjacent to the cab 18 and a forward end 24 defining a grille 26 at the front of the work vehicle 10. As such, the hood enclosure 20 may be configured to least partially surround and/or cover various under-hood components of the work vehicle 10, such as an engine 28, an engine cooling system 30 and an air cleaning system 32 of the work vehicle 10.

It should be appreciated that the hood enclosure 20 may be formed from a single panel or a plurality of different panels coupled together so as to surround and/or encase the under-hood components of the work vehicle 10.

Figure 2:
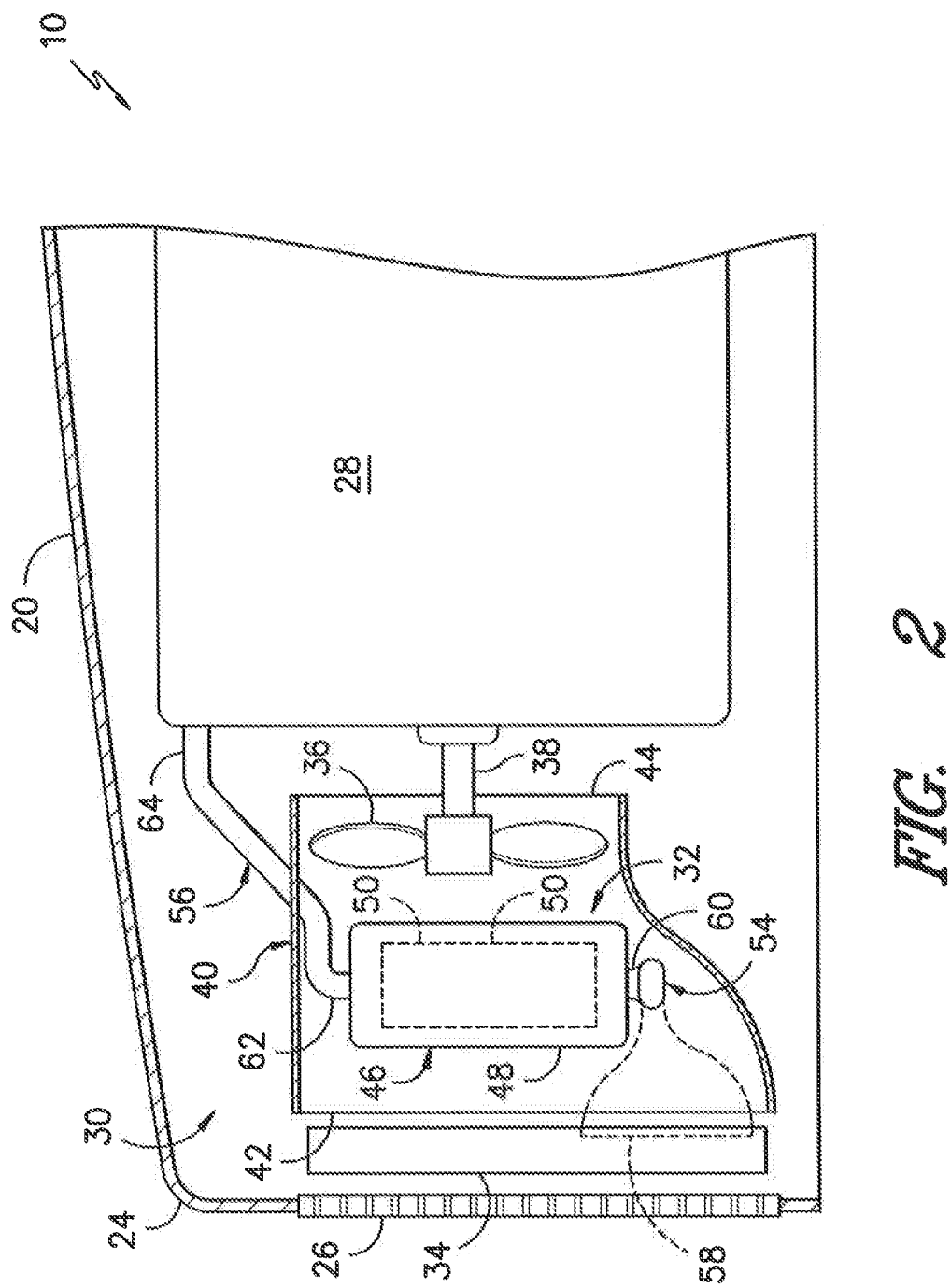
FIG. 2 illustrates a cross-sectional, internal side view of the hood enclosure shown in FIG. 1, particularly illustrating one embodiment of an air filter arrangement in accordance with aspects of the present subject matter.
Figure 3:
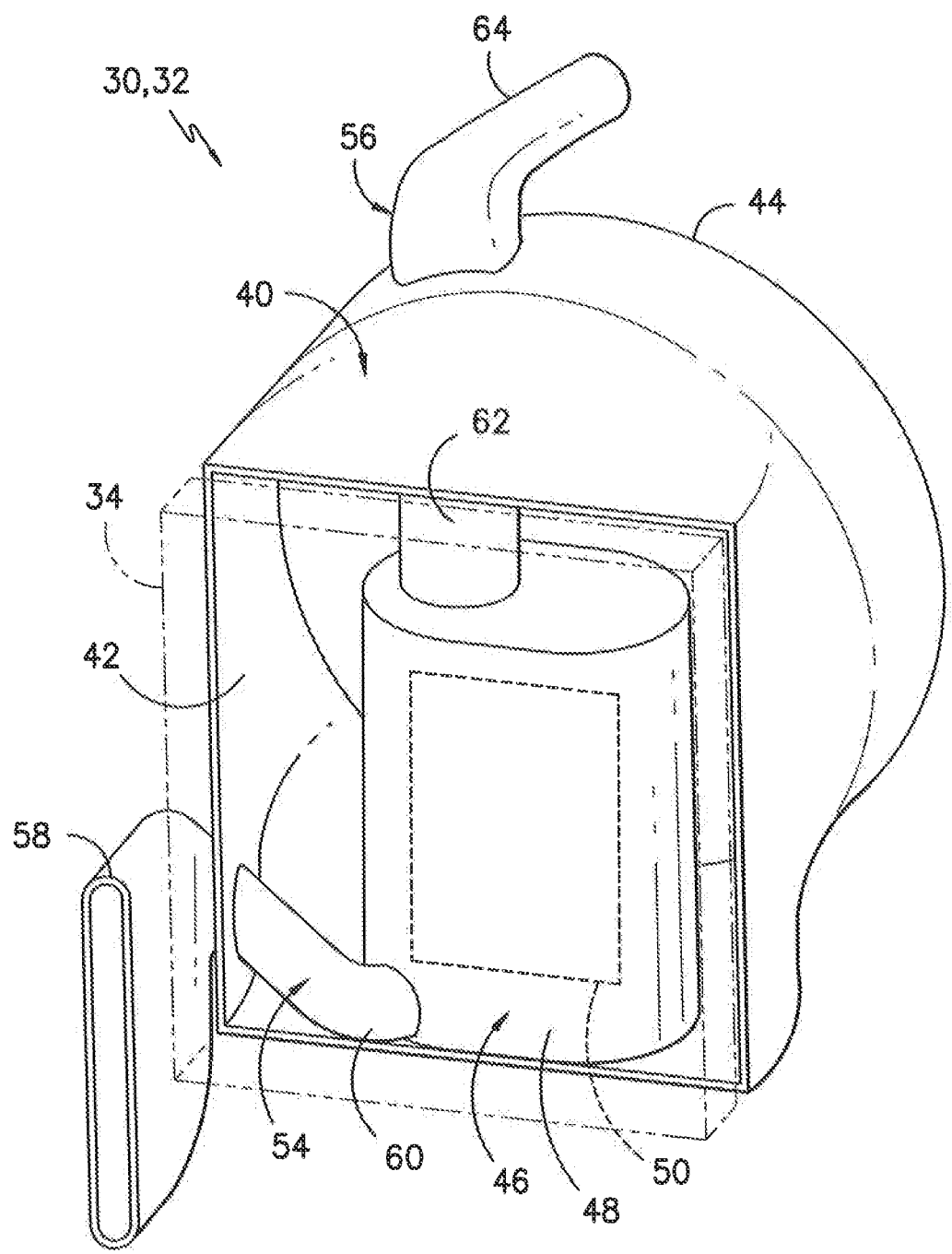
FIG. 3 illustrates a front, perspective view of the filter arrangement shown in FIG. 2.
Figure 4:
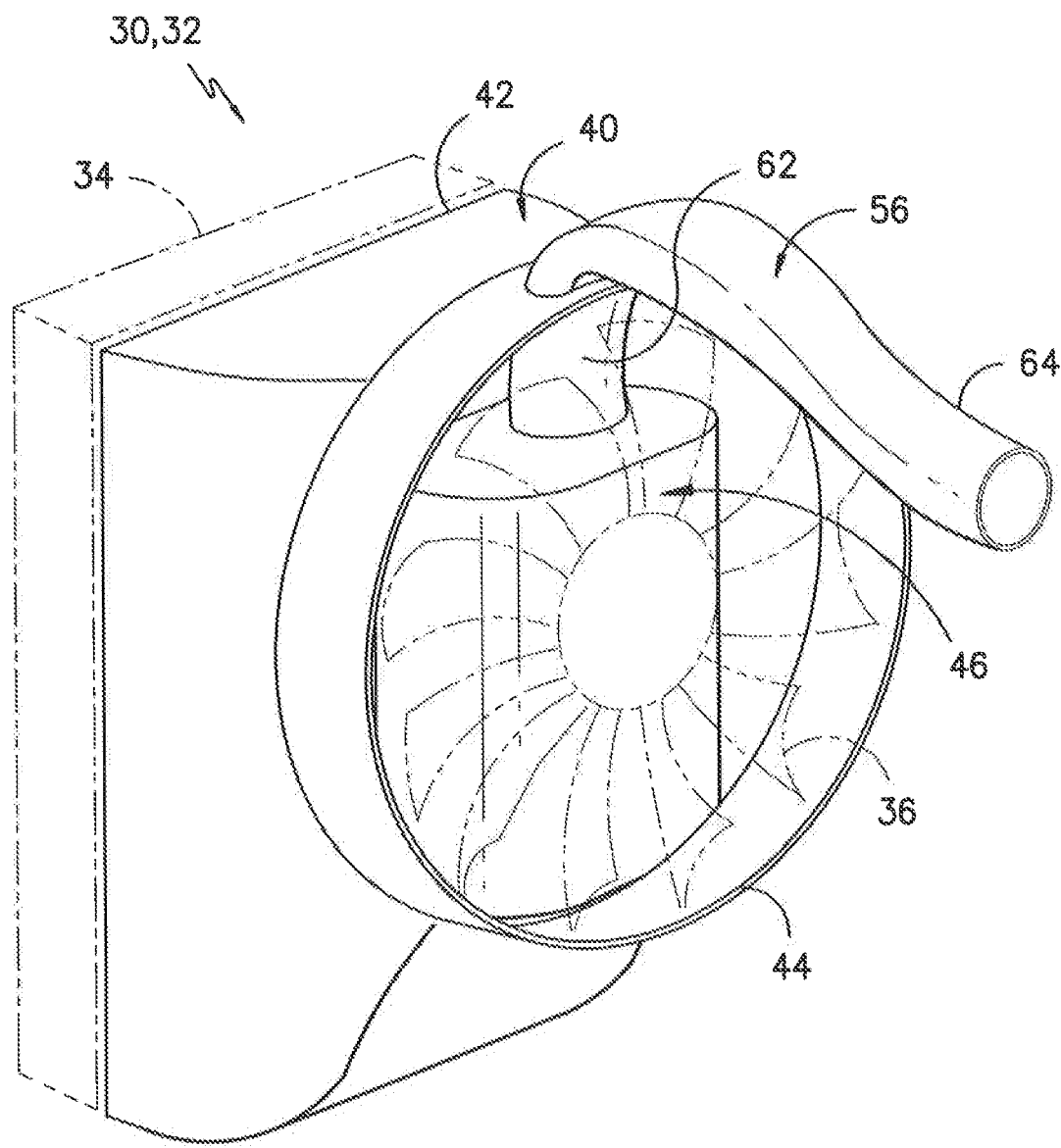
FIG. 4 illustrates a back, perspective view of the filter arrangement shown in FIG. 2.

Referring now to FIGS. 2-4, several views of various components of the cooling and air cleaning systems 30, 32 of the work vehicle 10 are illustrated in accordance with aspects of the present subject matter. Specifically, FIG. 2 illustrates a cross-sectional, internal side view of the hood enclosure 20 of the work vehicle 10, particularly illustrating a simplified view of one embodiment of a suitable air filter arrangement for the work vehicle 10. Additionally, FIGS. 3 and 4 illustrate front and rear perspective views, respectively, of the air filter arrangement shown in FIG. 2.

As particularly shown in FIG. 2, the cooling system 30 may generally include one or more heat exchangers 34 disposed directly adjacent to the front grille 26 of the work vehicle 10. As is generally understood, the heat exchanger(s) 34 may be configured to cool the engine fluid(s) and/or the other fluid(s) utilized during operation of the work vehicle 10 by transmitting such fluid(s) through a plurality of tubes having suitable heat transfer features (e.g., cooling fins, rods, coils and/or the like) so that heat is transferred from the fluid(s) to an airflow passing over and across the tubes. For instance, in several embodiments, the heat exchanger(s) 34 may comprise one or more radiators, intercoolers, fuel coolers, transmission fluid coolers, engine oil coolers and/or the like.

It should be appreciated that, in embodiments in which the cooling system 30 includes more than one heat exchanger 34, the heat exchangers 34 may generally be disposed at any suitable location within the hood enclosure 20 relative to one another. However, in a particular embodiment of the present subject matter, the heat exchangers 34 may be aligned relative to one another so as to have a generally planar orientation at and/or adjacent to the front grille 26, such as by aligning the heat exchangers 34 in a plane that extends generally parallel to the plane defined by the front grille 26.

In addition, the cooling system 30 may also include a fan 36 configured to generate an airflow through the heat exchanger(s) 34. As shown in FIG. 2, in one embodiment, the fan 36 may be coupled to an output shaft 38 of the engine 38. Thus, as the fan 36 is rotatably driven by the output shall 38, air from the outside of the work vehicle 10 may be drawn into the grille 26 and through the heat exchanger(s) 34, thereby providing for heat to be transferred from the fluid(s) flowing within the heat exchanger(s) to the air. However, in other embodiments, the fan 36 may be rotatably driven using any other suitable drive means, such as separate drive motor.

Moreover, as shown in FIGS. 2-4, the cooling system 30 may also include a fan shroud 40 configured to encase or otherwise surround the fan 36. In general, the fan shroud 40 may be configured to define a passageway for the air drawn through the heat exchanger(s) 34 by the fan 36. For example, as shown in FIG. 2, the fan shroud 40 may define a shroud inlet 42 disposed adjacent to the heat exchanger(s) 34 and a shroud outlet 44 disposed aft of the fan 36. As such, the air passing through the heat exchanger(s) 34 may be received by the shroud inlet 42 and expelled from the fan shroud 40 via the shroud outlet 44.

As particularly shown in FIGS. 3 and 4, in one embodiment, the fan shroud 40 may be configured to transition from a generally rectangular shape at the shroud inlet 42 to a generally circular shape at the shroud outlet 44. As such, the rectangular opening defined by the shroud inlet 42 may be configured to capture the air flowing through the generally rectangular-shaped heat exchanger(s) 34 while the circular portion of the fan shroud 40 extending towards the shroud outlet 44 may be configured to encase or surround the blades of the fan 36. However, it should be appreciated that, in alternative embodiments, the fan shroud 40 may have any other suitable configuration/shape that permits it to function as described herein.

Referring still to FIGS. 2-4, the air cleaning system 32 of the work vehicle 10 may generally include an air filter 46 configured to receive and clean a portion of the air entering the work vehicle 10 through the front grille 26 and deliver such cleaned air to the engine 28 to be mixed with fuel and combusted. As indicated above, in accordance with aspects of the present subject matter, the air filter 46 may be disposed within the fan shroud 40. For example, as shown in FIG. 2, the air filter 46 may be disposed between the heat exchanger(s) 34 (or shroud inlet 42) and the fan 36. As such, the air flowing through the heat exchangers 34 and into the shroud inlet 42 may be directed around the air filter 46 prior to be expelled from the shroud outlet 44.

In general, the air filter 46 may comprise any suitable air filter/cleaner known in the art that is configured to capture, filter or otherwise separate particulate matter, such as dust, dirt or other debris, from the air before such it is delivered to the engine for subsequent mixing/combustion. As shown in FIGS. 2 and 3, the air filter 46 may generally include a housing 48 configured to encase a suitable filter element 50. The filter element 50 may, in several embodiments, be made from a fibrous or mesh material that is configured to allow air to pass therethrough while catching or trapping particulate matter contained within the air.

It should be appreciated that the air filter 46 may be configured to be mounted within the fan shroud 40 using any suitable attachment/mounting means known in the art. For example, in one embodiment, one or more suitable mounting brackets (not shown) may be coupled between the fan shroud 40 and the air filter 46 to secure the filter 46 within the shroud 40. In such an embodiment, it may be desirable to design the mounting bracket(s) so that the smallest dimensional width of the bracket(s) is oriented perpendicular to the direction of the flow of air through the fan shroud 40 in order to maximize the cross-sectional flow area of the shroud 40, thereby optimizing heat exchanger performance and minimizing parasitic fan loses.

Additionally, as shown in the illustrated embodiment, the air cleaning system 32 may also include an inlet duct 54 and an outlet duct 56 in fluid communication with the air filter 46. The inlet duct 54 may generally be configured to receive a portion of the air flowing through the front grille 26 (such portion of air being hereinafter referred to as the "dirty air") and direct such dirty air into the air filter 46 for subsequent filtering. For example, as shown in FIGS. 2 and 3, the inlet duct 54 may extend between an intake end 58, wherein dirty air flowing through the front grille 26 is received within the inlet duct 54, and a filter end 60, wherein the dirty air is supplied into the air filter 46. Similarly, the outlet duct 56 may generally be configured to receive the air exiting the air filter 46 (hereinafter referred to as the "cleaned air") and direct such cleaned air to the engine 28. Thus, as shown in FIG. 2-4, the outlet duct 56 may extend between a filter end 62, wherein the cleaned air expelled from the air filter 46 is received within the outlet duct 56, and an engine end 64, wherein the cleaned air is supplied into the engine 28.

In several embodiments, the dirty air received by the air filter 46 may be isolated from the air flowing through the heat exchanger(s) 34 and into the fan shroud 40 via the shroud inlet 42. For example, as shown in FIGS. 2 and 3, in one embodiment, the inlet duct 54 may be configured to extend through a portion the fan shroud 40 (e.g., by extending through a wall of the fan shroud 40) such that the intake end 58 of the inlet duct 54 is disposed outside of the fan shroud 40 while the filter end 60 of the inlet duct 54 is disposed inside the fan shroud 40. In such an embodiment, the intake end 58 may generally be configured to extend outside the fan shroud 40 to any suitable location at which a portion of the air entering the work machine 10 via the grille 26 (i.e., the "dirty air") may be directed into the inlet duct 54. For example, as particularly shown in FIG. 3, the inlet duct 54 may be configured to extend through the fan shroud 40 and may be bent or curved forward such that the intake end 58 disposed adjacent to the side of the shroud inlet 42 and/or the heat exchanger(s) 34. As such, when air is pulled into the grille 26 by the fan 36, a portion of the air may be directed through the heat exchanger(s) 34 and into the fan shroud 40, with such air flowing around the air filter 46, while a separate portion of the air (i.e., the "dirty air") may be directed into the air scoop or opening defined at the intake end 58 of the inlet duct 54. Such dirty air may then flow through the inlet duct 54 and into the air filter 46 for subsequent filtering.

Similarly, the outlet duct 56 may also be configured to extend through a portion the fan shroud 40. For example, as shown in FIGS. 2 and 4, the outlet duct 56 may be configured to extend through the fan shroud 40 at a location adjacent to the fan 36 and may be curved or bent rearwards such that the cleaned air flowing through the outlet duct 56 may be directed into the engine 28.

It should be appreciated that, when the air filter 46 is positioned within the fan shroud 40, access may be gained to the air filter 46 in a variety of different ways. For example, in one embodiment, the heat exchanger(s) 34 may be removed to gain access to the air filter 46. In another embodiment, the heat exchanger(s) 34 may be pivotally supported within the work vehicle 10 such that the heat exchanger(s) 34 may be rotated away from the shroud inlet 42, thereby providing access to the air filter 46. In a further embodiment, a portion of the fan shroud 40 may be removable or pivotable to allow access to the air filter 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air filter arrangement for a work vehicle, the air filter arrangement comprising:
    a fan shroud extending between a shroud inlet and a shroud outlet;
    at least one heat exchanger disposed adjacent to the shroud inlet;
    a fan disposed within the fan shroud between the shroud inlet and shroud outlet, the fan being configured to draw air through the at least one heat exchanger and between the shroud inlet and shroud outlet;
    an air filter disposed within the fan shroud between the fan and the at least one heat exchanger such that the air flowing through the at least one heat exchanger and between the shroud inlet and shroud outlet is directed around the air filter; and
    an inlet duct in fluid communication with the air filter, the inlet duct including an intake end configured to receive dirty air entering a portion of the work vehicle and a filter end at which the dirty air is directed into the air filter, the intake end being disposed outside of the fan shroud and the filter end being disposed inside the fan shroud.

2. The air filter arrangement of claim 1, wherein the air filter is configured to receive and filter dirty air entering a portion of the work vehicle, the dirty air received by the air filter being isolated from the air being drawn through the at least one heat exchanger between the shroud inlet and the shroud outlet.

3. The air filter arrangement of claim 1, wherein the inlet duct extends through a portion of the fan shroud between the intake end and the filter end.

4. The air filter arrangement of claim 1, wherein the intake end of the inlet duct is disposed adjacent to the shroud inlet.

5. The air filter arrangement of claim 1, further comprising an outlet duct configured to direct cleaned air from the air filter to an engine of the work vehicle, the outlet duct extending through the fan shroud such that a portion of the outlet duct is disposed within the fan shroud and a portion of the outlet duct is disposed outside the fan shroud.

6. An air filter arrangement for a work vehicle, the air filter arrangement comprising:
    a fan shroud defining a shroud inlet and a shroud outlet;
    a fan disposed within the fan shroud between the shroud inlet and shroud outlet, the fan configured to draw air into the shroud inlet;
    an air filter disposed within the fan shroud, the air filter being configured to receive and filter dirty air entering a portion of the work vehicle, wherein the dirty air received by the air filter is isolated from the air being drawn into the shroud inlet; and
    an inlet duct in fluid communication with the air filter, the inlet duct including an intake end configured to receive the dirty air entering the work vehicle and a filter end at which the dirty air is directed into the air filter, the intake end being disposed outside of the fan shroud and the filter end being disposed inside the fan shroud.

7. The air filter arrangement of claim 6, further comprising at least at least one heat exchanger disposed adjacent to the shroud inlet, the air filter being disposed within the fan shroud between the fan and the at least one heat exchanger.

8. The air filter arrangement of claim 6, wherein the inlet duct extends through a portion of the fan shroud between the intake end and the filter end.

9. The air filter arrangement of claim 6, wherein the intake end of the inlet duct is disposed adjacent to the shroud inlet.

10. The air filter arrangement of claim 6, further comprising an outlet duct configured to direct cleaned air from the air filter to an engine of the work vehicle, the outlet duct extending through the fan shroud such that a portion of the outlet duct is disposed within the fan shroud and a portion of the outlet duct is disposed outside the fan shroud.

11. A work vehicle, comprising:
an engine;
a hood enclosure surrounding at least a portion of the engine, the hood enclosure including a front grille;
a fan shroud disposed between the front grille and the engine, the fan shroud including a shroud inlet and a shroud outlet;
at least one heat exchanger disposed adjacent to the shroud inlet;
a fan disposed within the fan shroud between the shroud inlet and shroud outlet, the fan being configured to draw air through the at least one heat exchanger and between the shroud inlet and shroud outlet;
an air filter disposed within the fan shroud between the fan and the at least one heat exchanger such that the air flowing through the at least one heat exchanger and between the shroud inlet and shroud outlet is directed around the air filter; and
an inlet duct in fluid communication with the air filter, the inlet duct including an intake end configured to receive dirty air entering a portion of the work vehicle and a filter end at which the dirty air is directed into the air filter, the intake end being disposed outside of the fan shroud and the filter end being disposed inside the fan shroud.

12. The work vehicle of claim 11, wherein the air filter is configured to receive and filter dirty air entering a portion of the work vehicle, the dirty air received by the air filter being isolated from the air being drawn through the at least one heat exchanger between the shroud inlet and the shroud outlet.

13. The work vehicle of claim 11, wherein the inlet duct extends through a portion of the fan shroud between the intake end and the filter end.

14. The work vehicle of claim 11, wherein the intake end of the inlet duct is disposed adjacent to the shroud inlet.

15. The work vehicle of claim 11, further comprising an outlet duct configured to direct cleaned air from the air filter to an engine of the work vehicle, the outlet duct extending through the fan shroud such that a portion of the outlet duct is disposed within the fan shroud and a portion of the outlet duct is disposed outside the fan shroud.

* * * * *